(No Model.)

I. B. POTTS.
DETACHABLE PIPE COUPLING.

No. 406,060. Patented July 2, 1889.

Witnesses
Wm H. Brereton
John Bailey Johns.

Inventor
Isaac B. Potts

By his Attorney
T. W. Tallmadge

N. PETERS. Photo-Lithographer, Washington, D. C.

United States Patent Office.

ISAAC B. POTTS, OF COLUMBUS, OHIO.

DETACHABLE PIPE-COUPLING.

SPECIFICATION forming part of Letters Patent No. 406,060, dated July 2, 1889.

Application filed March 23, 1889. Serial No. 304,525. (No model.)

*To all whom it may concern:*

Be it known that I, ISAAC BROADWORTH POTTS, a citizen of the United States, residing at Columbus, in the county of Franklin and State of Ohio, have invented a new and useful Improvement in Detachable Pipe-Couplings, of which the following is a specification.

My invention is an improvement in detachable pipe-couplings; and my said invention consists of a detachable coupling for uniting the ends of a lead and iron pipe, composed of a screw-threaded member that receives the ends of the lead and iron pipe, a split or divided collar or bushing that is compressed around the end of the lead pipe, and a coupling-nut by which the parts are clamped together and united, said parts being constructed and adapted to operate substantially as and for the purposes as will be hereinafter more fully described and form the subject-matter of the annexed claims.

The object of my invention is to provide means whereby the ends of lead and iron pipe, or lead pipe and faucets or other fittings, may be quickly and effectually united without solder or wipe-joints; and with this end in view I proceed as follows, reference being had to the accompanying drawings for a better understanding of the details of construction of the parts, and in which drawings—

Figure 1:
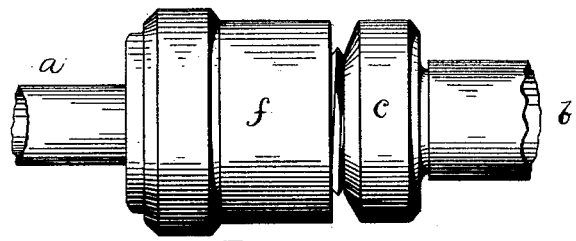
Figure 2:
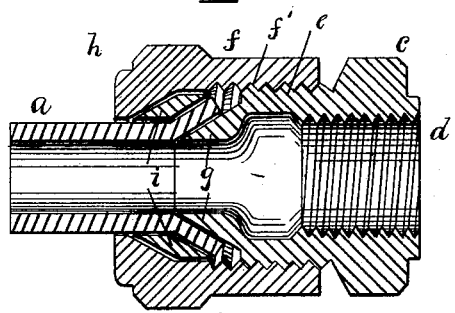
Figure 3:
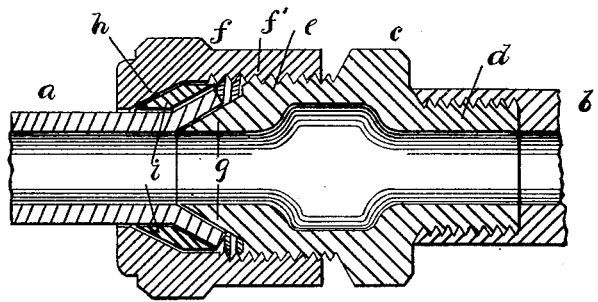
Figure 4:
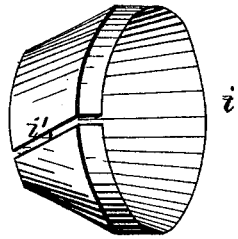

Figure 1 is a view in elevation of a detachable pipe-coupling constructed according to my invention, and Figs. 2 and 3 central longitudinal sectional elevations of the same. Fig. 4 is a detached view of the split collar bushing.

Similar letters of reference designate like parts in the several views.

The letter $a$ indicates the lead and $b$ the iron pipe to be united. The coupling is composed of the member $c$, which has a threaded end $d$ to receive the iron pipe $b$, and this screw-threaded part $d$ may be external or a "male," as in Fig. 3, or internal or "female," as in Fig. 2, the iron pipe to be coupled being correspondingly screw-threaded to be received upon or within said end of member $c$. This member $c$ is also screw-threaded, as at $e$, to receive the coupling-nut $f$, and, in addition to this screw-threaded portion $e$ of member $c$, the inner end thereof is tapered or made cone-shaped, at at $g$, for the purposes as will presently appear. $f$ is the coupling-nut, which is screw-threaded, as at $f'$, and is received upon the threaded portion $e$ of member $c$, and thereby unites the parts. Within the head of this nut $f$ is a tapered seat $h$, which corresponds with the taper of the end $g$ of the member $c$ of the coupling, and within this seat $h$ is a collar or bushing $i$, which bushing, as shown in Fig. 4, is in the form of a conical ring or tapered collar, and is split or divided, as at $i$, which split is at an angle, as at $i'$.

To unite a lead and iron pipe by my coupling, the member $c$ is first screwed upon the end of the iron pipe $b$, which pipe $b$, if not already screw-threaded at its end, is so threaded either externally or internally to receive the said member $c$, the coupling-nut $f$, and then the collar $i$ is now slipped upon the end of lead pipe $a$, and the nut $f$ screwed upon the member $c$. This draws the tapered end of member $c$ within the end of the lead pipe $a$ and causes said end of pipe $a$ to be flared outward and clamped between the collar $i$ and end $g$ of member $c$. At the same time that the end of the lead pipe is flared outward by the movement of nut $f$, the tapered interior of said nut, acting upon the corresponding tapered external surface of the annular collar $i$, compresses said collar around and clamps the same tight upon the lead pipe, the split of said collar permitting the compression or decreasing of the diameter thereof. A secure and tight joint is therefore the result.

Having thus fully described my invention, I claim as new therein—

In a pipe-coupling, the combination, with the part $c$, formed with screw-threaded outer end $d$ and tapered inner end $g$, of the coupling-nut $f$, received upon said part $c$ and formed with an interior taper or inclined seat $h$, and narrow collar $i$, which collar fits wholly within the nut $f$ upon the seat $h$ thereof and is split at an angle longitudinally of its length, as at $i'$, and is formed with a cone-shaped exterior corresponding to the taper of the said seat $h$ of the nut $f$ and an interior taper to correspond with the taper of the end $g$ of the part $c$, as described, for the purposes specified.

ISAAC B. POTTS.

In presence of—
WM. H. BRERETON,
HARVEY S. W. DE GAW.